(12) United States Patent
Shah et al.

(10) Patent No.: US 11,249,821 B1
(45) Date of Patent: Feb. 15, 2022

(54) CROSS-PLATFORM CONTEXT ACTIVATION

(71) Applicant: Microsoft Technology Licensing, LLC, Redmond, WA (US)

(72) Inventors: Shrey Nitin Shah, Redmond, WA (US); Vishnu Nath, Bellevue, WA (US); Shilpa Ranganathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/224,469

(22) Filed: Apr. 7, 2021

(51) Int. Cl.
*G06F 3/00* (2006.01)
*G06F 9/54* (2006.01)
*G06F 9/50* (2006.01)

(52) U.S. Cl.
CPC ............ *G06F 9/541* (2013.01); *G06F 9/5005* (2013.01)

(58) Field of Classification Search
CPC ....................................................... G06F 9/541
USPC ........................................................ 719/310
See application file for complete search history.

(56) References Cited

U.S. PATENT DOCUMENTS

| 2013/0262696 A1* | 10/2013 | Watanabe | H04L 63/0281 709/238 |
| 2017/0302592 A1* | 10/2017 | Anschutz | G06F 12/0806 |
| 2021/0263774 A1* | 8/2021 | Maar | G06F 16/45 |

OTHER PUBLICATIONS

T. Berners-Lee, Uniform Resource Identifiers (URI): Generic Syntax. (Year: 1998).*

* cited by examiner

*Primary Examiner* — Lechi Truong

(57) ABSTRACT

In non-limiting examples of the present disclosure, systems, methods and devices for transferring application state are provided. A connection between a first computing device and a second computing device may be established. A determination that a triggering event has occurred may be made. Application context data may be automatically obtained from a first application being executed by the first computing device, wherein the application context data is in a first format and the application context data specifies a location of a resource being accessed by the first application on the first computing device. The application context data may be transformed to a second format that is executable by the second platform. A second application of the second computing device that can open the resource via execution of the application context data in the second format may be selected. The resource may be opened by the second application.

20 Claims, 11 Drawing Sheets

FIG. 5
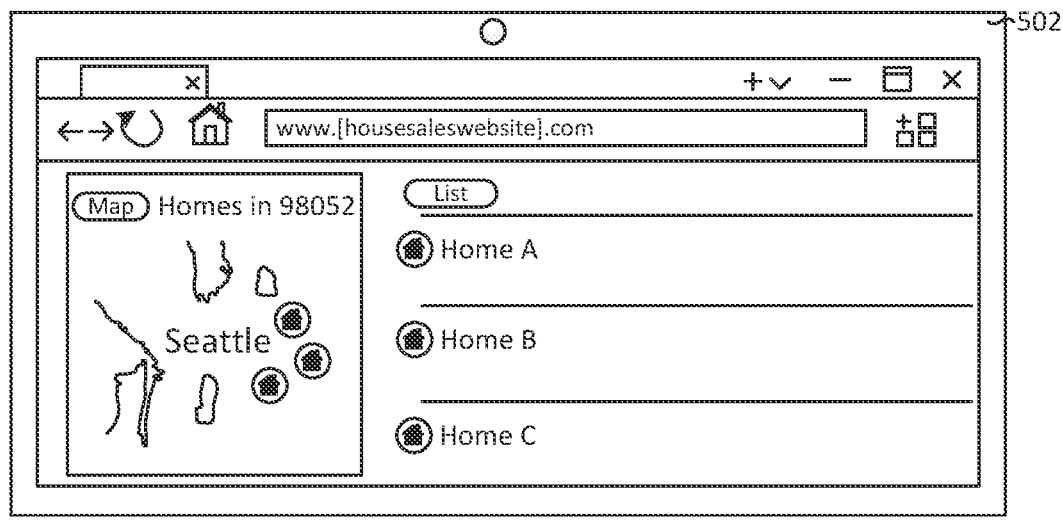
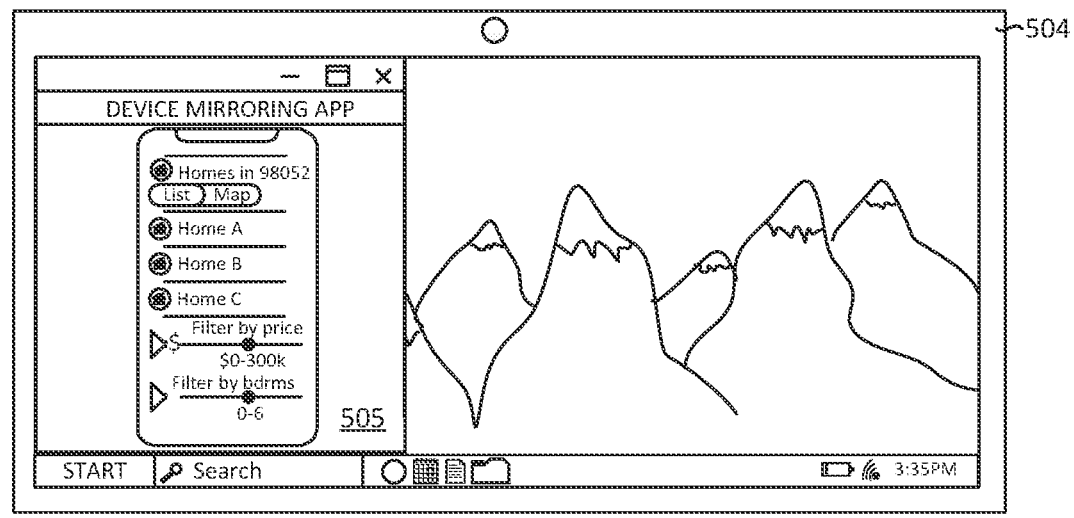
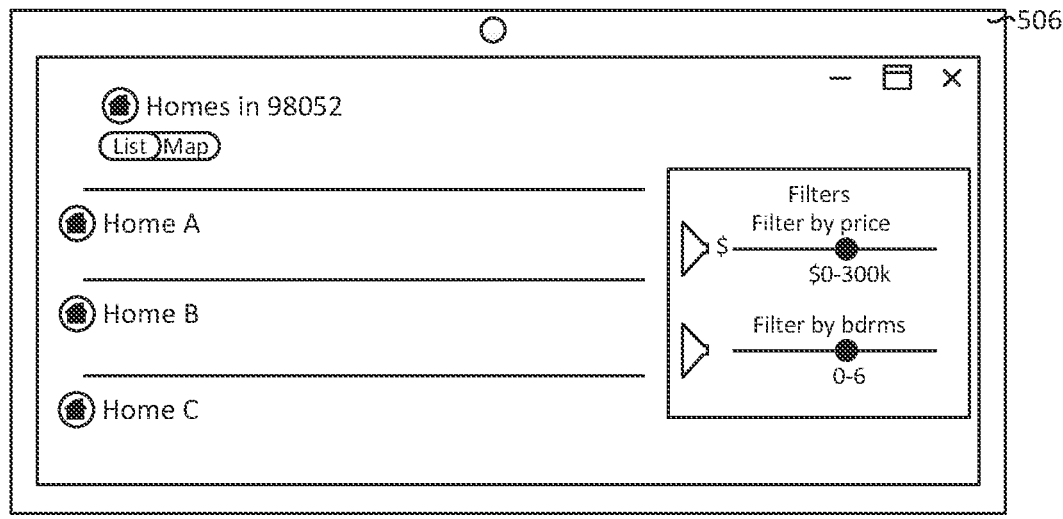

CROSS-PLATFORM CONTEXT ACTIVATION

BACKGROUND

Computing devices have become ubiquitous in most aspects of life. It is now common for users to be connected to at least one device at any given time, and sometimes even two or three devices at once. One of the reasons that computing devices have become so ubiquitous to everyday users is due to the number of options available to those users. For any given device type (e.g., phone, tablet, laptop, desktop) there are multiple device manufacturers with their own set of hardware configurations, in addition to unique operating system types and application suites that may be run on those devices. Thus, it is not uncommon for a user to have, and frequently use, a smart phone that operates on a first platform, a tablet that operates on a second platform, and one or more desktop and/or laptop computing devices that operate on one or more additional platforms. Additionally, software applications are often specific to a particular device type (e.g., mobile device, desktop device) and/or a specific operating system.

Users frequently transition between their devices based on various factors (e.g., user location, time of day, activity being performed). Transitioning activities from a first device to a second device can be time consuming because not all devices may include the same applications and/or access to the same resources.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with capturing application context data from one or more applications executed by a first computing device operating on a first platform, translating that information into a platform agnostic payload, transferring it to a second computing device operating on a second platform, and re-activating the application state on the second computing device. According to a first example, a computer-implemented method is provided. The computer-implemented method comprises establishing a connection between a first computing device operating on a first platform and a second computing device operating on a second platform; determining that a trigger event for obtaining application context data has occurred; automatically obtaining, based on the determination that the trigger event has occurred, application context data from a first application being currently executed by the first computing device, wherein the application context data is in a first format and the application context data specifies a location of a resource being currently accessed by the first application on the first computing device; transforming the application context data to a second format that is executable by the second platform; selecting a second application of the second computing device that can open the resource via execution of the application context data in the second format; and opening the resource by the second application on the second computing device via execution of the application context data in the second format.

According to an additional example, a system is provided. The system comprises a memory for storing executable program code; and a processor, functionally coupled to the memory, the processor being responsive to computer-readable instructions contained in the program code and operative to: establish a connection between a source computing device operating on a first platform and a target computing device operating on a second platform; determine that a trigger event for obtaining application context data has occurred; automatically obtain, based on the determination that the trigger event has occurred, application context data from a first application being currently executed by the source computing device, wherein the application context data comprises: a uniform resource identifier (URI) defining a location of a resource currently being accessed by the first application on the source computing device, and a uniform resource locator (URL) for the resource currently being accessed by the first application on the source computing device; transform the URI to a format that is executable by the target computing device; apply one or more application prioritization rules to a browser application of the target computing device capable of opening the resource via execution of the URL and a second application of the target computing device capable of opening the resource via execution of the transformed URI; assign, based on application of the one or more application prioritization rules, a first score to the browser application and a second score to the second application; and open the resource by the highest-scored application on the target computing device.

In another example, a computer-readable storage device is provided. The computer-readable storage device comprises executable instructions that, when executed by a processor, assist with cross-platform resource access, the computer-readable storage device including instructions executable by the processor for: establishing a connection between a first computing device operating on a first platform and second computing device operating on a second platform; determining that a trigger event for obtaining application context data has occurred; automatically obtaining, based on the determination that the trigger event has occurred, application context data from a first application being currently executed by the first computing device, wherein the application context data is in a first format and the application context data specifies a location of a resource being currently accessed by the first application on the first computing device; transforming the application context data to a second format that is executable by the second platform; selecting a second application of the second computing device that can open the resource via execution of the application context data in the second format; and opening the resource by the second application on the second computing device via execution of the application context data in the second format.

BRIEF DESCRIPTION OF THE DRAWINGS

Non-limiting and non-exhaustive examples are described with reference to the following figures:

FIG. 5 illustrates three target computing devices and three different mechanisms for surfacing resources on a target computing device.

DETAILED DESCRIPTION

Figure 1:
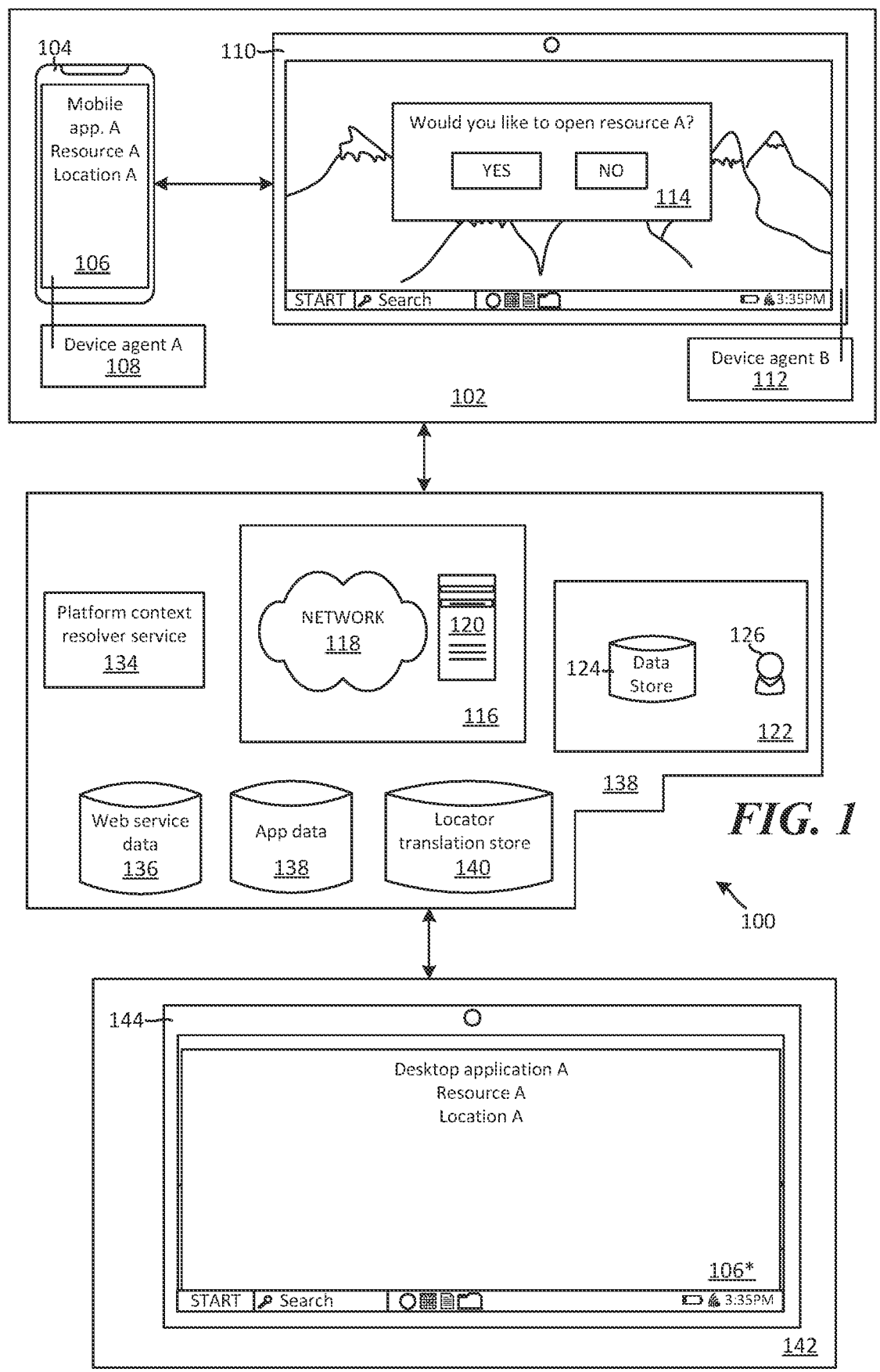
FIG. 1 is a schematic diagram illustrating an example distributed computing environment for enabling cross-platform access to resources and application context data.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for assisting with capturing application context data from one or more applications executed by a first computing device operating on a first platform, translating that information into a platform agnostic payload, transferring it to a second computing device operating on a second platform, and re-activating the application state on the second computing device. As used herein, "platform" describes a specific environment comprised of a set of computer hardware and an operating system on which software is executed. For example, a first computing device may be said to run on a first platform that is different than a second platform if it has a unique set of one or both of: hardware components and/or an operating system (including an operating system version), and a second computing device may be said to run on a second platform that is different from the first platform if it has a set of one or both of: hardware components and/or an operating system (including an operating system version), that is different than the first computing device. As described herein a "source computing device" refers to a computing device that initially accesses a resource on a first application and a "target computing device" refers to a computing device that receives application context data from the source computing device, and which executes that application context data to surface the resource on the same or different application as the source computing device to replicate the application state from the first application of the source computing device.

A first and second computing device may both execute a device agent application or service (referred to primarily herein as "device agent application"). The device agent application may assist with obtaining application context data, transforming the application context data to different formats, determining an appropriate application for executing the application context data, and surfacing resources corresponding to application context data. Application context data may include identifiers that define where one or more resources accessed by an application are located (e.g., in web data stores, in application data stores), values of one or more fields of a resource accessed by an application, and/or values of one or more objects of a resource accessed by an application. In some examples, the identifiers may define locations and/or data stores that are specific to a specific computing device and/or platform (e.g., an identifier may represent a piece of content, such as "app on my phone", that is specific to a computing device). The identifiers that define where one or more resources accessed by an application are located may comprise uniform resource locators (URLs) and/or uniform resource indicators (URIs), either of which may be platform or application specific, or platform or application agnostic. Although the identifiers that define where one or more resources accessed by an application are located are primarily described herein as comprising URLs or URIs, it should be understood that the mechanisms described herein may be applied to other identifier and payload formats.

A determination may be made by a source computing device that a trigger event has occurred. The trigger event may comprise the source computing device and the target computing device establishing a connection with one another, the source computing device and target computing device coming within a threshold distance of one another, the unlocking of the target computing device, and/or a manual user input by a user to one or both of the source computing device and/or the target computing device. It should be understood that these are but examples of trigger events and other single or multi-device operations may comprise a triggering event. In some examples, trigger event settings may be customized by a user to define what operations may comprise a trigger event.

Upon determining that a trigger event has occurred, the device agent application of the source computing device may request application context data from one or more applications executed by the source computing device. In doing so, the device agent application may send a message or broadcast to each of those applications that indicates it is ready to receive application context data, and/or the device agent application may individually query each application for its state (e.g., query each application for current application context data). The application context data for an application may comprise one or more URIs and/or URLs that define where one or more current resources being accessed by the application are located and/or one or more values included in those resources (e.g., values that are text strings in message objects of text messaging or chat applications, filter values in filter fields of search applications, input values in electronic documents open in electronic document applications). Any application context data that is received by the device agent application that is in a non-generic format (e.g., application specific URIs, operating system specific URLs) may be transformed to a platform agnostic format. The transformation may be performed by the source computing device, a remote service, and/or the target computing device.

The platform agnostic application context data may be received by the device agent application of the target computing device. The device agent application of the target computing device may transform the platform agnostic application context data into one or more different formats. The one or more different formats may be specific to the platform of the target computing device or one or more applications of the target computing device. For example, a platform agnostic URI may be transformed to a URI format that is specific to a version (e.g., desktop version, operating system version) of an application that is executed by the target computing device. The target computing device may then perform a check to determine which applications it has available to it (e.g., installed on it, accessible via the Internet) that are capable of executing the application context data in its one or more different formats (e.g., the formats that are specific to the platform of the target computing device or one or more applications of the target computing device).

Upon identifying that one or more applications are capable of executing the application context data and capable of surfacing the resource that was accessed on the source computing device, the device agent application of the target computing device may apply one or more policies/rules (e.g., application prioritization rules) that may be used to prioritize which applications should be utilized to surface the resource on the target computing device. One or more highest scored applications of the target computing device may then execute the application context data and surface the resource. In some examples, the one or more highest scored applications may be automatically launched, and the resource may be automatically surfaced on the target device. In other examples, a selectable option may be surfaced on the target computing device for launching one or more highest scored applications. If a selection is made of one of the selectable options (e.g., via a touch input of the selectable option, via a voice command), then an application corresponding to the selected option may be automatically launched and the resource may be surfaced via execution of the application context data by that application. The resource may be opened to the same or a similar location as was open on the source computing device. Additionally, any values that input on the resource may also be automatically input on the resource that is opened on the target computing device. In this manner the application state from the source computing device is replicated on the target computing device in an automated fashion that requires little, if any, manual input or decision making.

The systems, methods, and devices described herein provide technical advantages for transferring an application state from one computing device to another. Other solutions typically work within the confines of a single ecosystem (e.g., same operating system to same operating system) and would not provide generic affordances to move between platforms. Additionally, previous solutions would typically only provide mechanisms to move between devices where a cross-device variant of an application exists. Alternatively, examples described herein enable mechanisms for dynamically translating application context data (e.g., resource locators, resource values) to formats that are executable for surfacing resources and resource state on different platforms and different applications.

FIG. 1 is a schematic diagram illustrating an example distributed computing environment 100 for enabling cross-platform access to resources and application context data. Computing environment 100 includes dual platform sub-environment 102, cloud-based sub-environment 138, and target computing device surfacing sub-environment 142.

Cloud-based sub-environment 138 includes network and processing sub-environment 116, user profile sub-environment 122, web service data store 136, application data store 138, locator translation store 140, and platform context resolver service 134. Network and processing sub-environment 116 includes network 118 and server computing device 120. All of the computing devices described herein may communicate via a network, such as network 118 in network and processing sub-environment 116. Server computing device 120 is illustrative of one or more server computing devices that may execute cloud-based applications and/or cloud-based application services.

User profile sub-environment 122 includes user information 126 and data store 124. User information 126 may comprise identities of one or more user accounts and/or user account passwords that are associated with one or more applications, services, and/or computing devices. User information 126 may be stored in data store 124. User information 126 may associate a user account with first computing device 104, second computing device 110, and/or one or more applications executed by first computing device 104 and/or second computing device 110. User account information associated with first computing device 104, second computing device 110, and/or data store 124 may be utilized to access application data in application data store 138.

Application data store 138 is illustrative of data, associated with one or more applications, that may be saved to cloud-based storage. For example, one or more applications executed all or in part by a local computing device (e.g., first computing device 104, second computing device 110) may access electronic documents, electronic maps, application objects, image data, video data, and/or audio data that is saved to cloud storage, such as application data store 138. Resources (e.g., electronic documents, electronic maps, application objects, image data, video data, audio data) that applications store in application data store 138 may be associated with identifiers that are unique to each application. That is, each application may utilize a unique URI format that it uses to store its resource and locate its resources with. Additionally, some applications that store their resources in application data store 138 may only provide access to those resources when user credentials (e.g., from user information 126) for the application are authenticated.

Web service data 136 comprises websites and webpages that may be accessed from the world wide web on computing devices (e.g., first computing device 104, second computing device 110) via execution of one or more applications (e.g., web browser applications, website-specific applications). Locator translation store 140 may comprise translation lists and/or translation modules for translating resource locators (e.g., URLs, URIs) from a first format to one or more second formats. For example, locator translation store 140 may include a list of URI formats (e.g., URI input formats), a list of platform types (e.g., operating system type, device type), and a translation list that includes identities of format types that translate an input URI format to each platform type, if available.

Platform context resolver service 134 may include schemas that applications have registered with it. The schemas may define what the translation/transformation rules are for an application an its URIs and/or URLs, therefore providing for an application context data transformation that is even more likely to be accurate for a particular platform and/or a particular target device application. For example, an application may register a schema with platform context resolver service 134 that specifies the formats that the application's application context data may be received in (including platform specific formats and/or platform agnostic formats), and what the correct transformations are for that data for specific platforms or platform manifestations of the application. Thus, rather than inferring what the correct transformations are from a first format to a second format based on the formats and rules stored on and performed by target computing device 144 and/or locator translation store 140, platform context resolver service 134 may be queried for a specific schema, a specific application, and a specific target computing device platform.

In some examples, platform context resolver service 134 may apply hygiene to application context data that it receives from a source computing device prior to sending transformed application context data to a target computing device. For example, context resolver service 134 may apply one or more rules that specify that if application context data is received from a specific application, then it may only transform that application context data to a format that is executable for accessing resources from one or more specific locations. As an example, if the context resolver service 134 receives URI application context data for a music streaming application/service executed by first computing device 104, one or more hygiene rules associated with platform context resolver service 134 and/or the music streaming application/service may dictate that only a transformed format of the URI application context data that is executable for accessing resources from the music streaming application data source location may be sent to second computing device 144 (e.g., the transformed format cannot be executed to surface data from a third party). In another example, if context resolver service 134 receives URL application context data for a document generation/editing application/service executed by first computing device 104, one or more hygiene rules associated with platform context resolver service 134 and/or the document generation/editing application/service may dictate that only a transformed format of the URL application context data that is executable for accessing resources from a domain associated with the document generation/editing application/service may be sent to second computing device 144. Applying such hygiene rules ensures that malicious users cannot re-direct application users to inappropriate, inaccurate, and/or non-requested content.

Dual platform sub-environment 102 includes first computing device 104 and second computing device 110. First computing device 104 operates on a first platform and second computing device 110 operates on a second platform. In this example, first computing device 104 is a mobile computing device that may execute a first operating system and second computing device 110 is a desktop computing device that may execute a second operating system. First computing device 104 is currently executing a first application (mobile application A), which has accessed first resource 106 (resource A). First resource 106 is surfaced by first computing device 104 and a specific location (location A) of that resource is currently being surfaced by first computing device 104. As an example, first resource 106 may comprise an electronic document, and a specific location (e.g., a page) of that electronic document may be displayed. In another example, first resource 106 may comprise an audio file or video file and a specific location (e.g., time in the audio or video file) of the electronic audio or video file may currently be playing. Resource 106 may comprise a cloud-based resource accessed by the first application via a network such as network 118. That is, resource 106 may be stored in application data store 138 and be locatable via one or more URIs of one or more formats and/or resource 106 may be stored in web service data store 136 and be locatable via one or more URLs of one or more formats.

Device agent A 108 and device agent B 112 may comprise an application or service that is utilized to transfer application context data from an application executed by a source computing device (e.g., first computing device 104) to a target computing device (e.g., second computing device 110), transform that application context data to a format that is executable by the source computing device and/or an application executed by the target computing device, and surface the resource corresponding to the application context data on the target computing device in a same state as it was accessed on the source computing device.

In this example, a trigger event is determined to have occurred by first computing device 104. The trigger event may comprise first computing device 102 and second computing device 110 establishing a connection with one another (e.g., a Bluetooth connection, a Wi-Fi connection, a wired connection), first computing device 104 and second computing device 110 coming within a threshold distance of one another (e.g., determined via analysis of wireless signal strength, determined via GPS), the unlocking of second computing device 110 (e.g., "point of presence"), and/or manual user input by a user to one or both of first computing device 104 and/or second computing device 110. In some examples, the trigger event may comprise multiple triggers. For example, a first determination may be made that the computing devices have established a connection with one another, the connection may cause a confirmation window, such as confirmation window 114 to be surfaced, and a user providing input (e.g., interacting with the "YES" element) to confirmation window 114 may complete the trigger event.

Once a determination is made that the trigger event has occurred, device agent A 108 may obtain application context data from one or more applications executed by first computing device 104. The application context data may comprise locations of resources currently being accessed by an application, values of one or more fields included in one or more resources currently being accessed by an application, and/or values of objects that are included in resources currently being accessed by an application. Thus, in this example, device agent A 108 may receive application context data for resource A 106. The application context data may comprise one or more URIs and/or URLs that are executable by first computing device 104, and/or the application surfacing first resource 106 on first computing device 106, for locating and surfacing first resource 106. Those URIs and/or URLs may be received in a format that is specific to the platform of first computing device 104.

Device agent A 108 may receive the platform specific application context data from application A and transform it to a platform agnostic format. If the application context data it received from application A is already in an application agnostic format (e.g., a standard URL) it may only transform the application specific URIs it received, if any. The application context data may then be sent to second computing device for processing by device agent B 112.

Device agent B 112 may receive the platform agnostic application context data and convert it to a platform specific format. That is, device agent B 112 may convert the platform agnostic application context data to a format that is executable by second computing device 110, the operating system of second computing device 110, or an application that is specific to second computing device 110. For example, the application context data may need to be converted to a URI format that is executable by a desktop version of application A or an operating system specific version of application A. In other examples, a URI specific to an application (e.g., specific to application A) may be transformed by device agent B 112 to a URL format that may be executable for locating and surfacing the resource (e.g., first resource 106) via execution of a web browser application by second computing device 110. In some examples, the transformation of application context data from a platform agnostic format to a platform/application specific format may be performed based on one or more transformation rules that are local to a target computing device (e.g., second computing device 110). In other examples, the target computing device may communicate (e.g., via device agent B 112 and network 118) with platform context resolver service 134 to determine whether an application has registered a schema that defines what its transformation rules are, therefore eliminating any inferences that need to be made as to transformation rules for a particular application or platform.

Once the application context data has been transformed to a format that is executable by second computing device 110 and/or an application executed by second computing device 110, an additional check may be made as to which applications of second computing device 110 are capable of executing the transformed application context data. A context/deep link policy engine may then score one or more of the applications that are determined to be capable of executing the transformed application context. Second computing device 110 may then surface the resource (e.g., resource 106) via one or more highest scored applications, as illustrated by second computing device 144, which is the same computing device as computing device 110.

First resource 106* has been opened, via execution of the desktop version of application A and transformed application context data from application A (e.g., the mobile version of application A executed by first computing device 104). First resource 106* may be opened to the specific location (e.g., same page may be displayed, same time location may be played, same objects may be displayed) that it was being accessed at on first computing device 104. As such, the state of application A from first computing device 104 may be replicated on second computing device 144 via the surfacing of first resource 106* on the desktop version of application A.

According to some examples, the content or resources that are surfaced on the target computing device (e.g., second computing device 144) may provide a complementary experience to the original content or resources that were accessed by the source computing device (e.g., first computing device 104), in association with the source computing device. That is, the transformed application context data may provide access to different, although complimentary, content or resources (e.g., a partial resource, a related resource), and the different content or resources may be accessed in tandem with the source and target computing devices. As an example, a calendar item open on a source computing device may have an attached slide deck resource, and upon a getting close to a target computing device (e.g. the trigger event), the second platform experience may comprise the slide deck being surfaced and/or projected on the target computing device (e.g., second computing device 144), and the source computing device (e.g., first computing device 104) may now perform actions of a presentation controller for the surfaced or projected slide deck.

Figure 2:
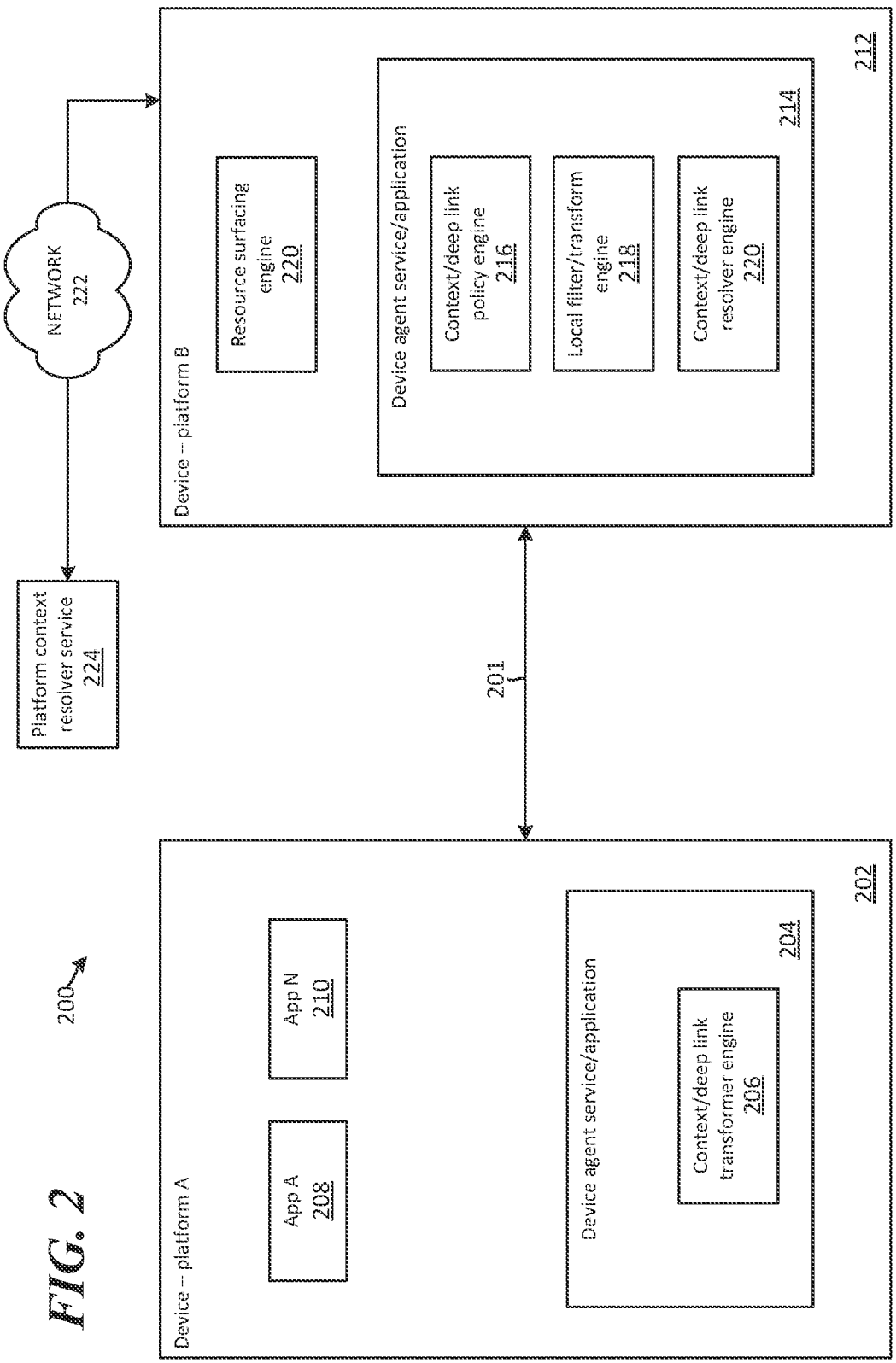
FIG. 2 is a schematic diagram of two different computing devices operating on different platforms that may share application context data with one another.

FIG. 2 is a schematic diagram 200 of two different computing devices operating on different platforms that may share application context data with one another. Diagram 200 includes source computing device 202, which operates on a first platform (platform A), target computing device 212, which operates on a second platform (platform B), network 222, and platform context resolver service 224. Any of the computing devices described herein may communicate with one another, or with platform context resolver service 224, via a network, such as network 222. In this example, source computing device 202 and target computing device 212 are connected via local connection 201 (e.g., Bluetooth, Wi-Fi, local area network, wired connection).

Source computing device 202 includes device agent service/application 204, which further includes context/deep link transformer engine 206. Device agent service/application 204 may comprise an application or service that is installed on source computing device 202 and which may perform actions associated with application context data provided by applications executed by source computing device 202, such as application A 208 and application N 210. Context/deep link transformer engine 206 may receive application context data from applications executed by source computing device 202 and transform it to a platform agnostic format. That is, the applications executed by the source computing device may provide context/deep link transformer engine 206 with application context data that is in an application and/or platform specific format (e.g., format specific to platform A, format specific to the applications being executed by platform A), and context/deep link transformer engine 206 may transform that application context data to a platform agnostic format.

Transforming the application context data from a first format to a platform agnostic format may comprise determining a type of format that the first format comprises (e.g., an operating system specific URI, an application specific URI) and identifying a local or remote transformation service that provides a platform agnostic transformation for that first format. In some examples, context/deep link transformer engine 206 may call another service (e.g., locator translation store 140, platform context resolver service 224) or API (an API that calls a local transformation service, an API that calls a remote transformations service) to transform the application context data from the first format to a platform agnostic format. In some examples, context/deep link transformer engine 206 may receive application context data in a generic (e.g., platform agnostic) format that does not need to be transformed. Regardless, once the application context data is in a platform agnostic format, it may be transferred to target computing device 212. Although in this example, context/deep link transformer engine 206 is illustrated as being included in source computing device 202, in other examples context/deep link transformer engine 206 and its associated operations may be executed by target computing device 212.

Target computing device 212 includes device agent service/application 214, which further includes context/deep link resolver engine 220, local filter/transform engine 218, and context/deep link policy engine 216. Target computing device 212 also includes resource surfacing engine 220.

Context/deep link resolver engine 220 may receive platform agnostic application context data and transform it to a format that is specific to the platform of target computing device 212 (e.g., platform B) and/or specific to an application executed by target computing device 212. The transformation of application context data by context/deep link resolver engine 220 may comprise application of one or more rules that map application context data in a platform agnostic format to a format that is executable by target computing device 212 and/or executable by an application executed by target computing device 212. That is, context/deep link resolver engine 220 may have rules that dictate that application context data received in one or more first platform agnostic formats be transformed to one or more second formats based on the platform of target computing device 212 and/or based on one or more application types executed by target computing device 212.

In some examples, applications may register schemas that define what their resource identifier translation/transformation rules are, therefore providing for an application context data transformation that is even more likely to be accurate for a particular platform and/or a particular target device application. For example, an application may register a schema with platform context resolver service 224 that specifies the formats that their application context data may be received in (including platform specific formats and/or platform agnostic formats), and what the correct transformations are for that data for specific platforms or platform manifestations of their applications. Thus, rather than inferring what the correct transformation is from a first format to a second format based on the formats and rules as performed by context/deep link resolver engine 220, platform context resolver service 224 may be queried for a specific schema, a specific application, and a specific target computing device platform.

Local filter/transform engine 218 may receive application context data that has been transformed to a format specific to target computing device 212 and/or specific to an application executed by target computing device 212 and confirm that target computing device 212 has an application that can execute that data. For example, if the transformed application data received from context/deep link resolver engine 220 and/or platform context resolver service 224 is a set URIs in a specific application format, local filter/transform engine 218 may determine whether those URIs are supported and executable by one or more applications installed on target computing device 212. The determination of whether application context data in a specific format is executable by an application may be made by making explicit requests to applications that are being executed by target computing device 212 and/or by analyzing files or registry entries of applications.

Context/deep link policy engine 216 may apply one or more rules (e.g., application prioritization rules) to received application context data to determine how to surface a corresponding resource. For example, target computing device 212, the application that provided the application context data, or another party, may have policies that dictate a preferred manner which a resource should be surfaced. Those policies may include preferences for one or more of: surfacing the resource in the application itself (e.g., if application A 208 originated the application context data corresponding to a resource, then surface the corresponding resource via the same application on target computing device 212), surfacing the resource in a web experience, surfacing the resource in a different application, providing the user of the target computing device with an option to choose a mechanism for surfacing the resource, and/or intelligently identifying a user preference for surfacing the resource. In examples where a determination is made by context/deep link policy engine 216 that a specific application should be utilized to surface a resource, but the specific application is not installed on target computing device 212, context/deep link policy engine 216 may cause a selectable element for downloading the specific application to be surfaced by target computing device 212. In some examples, the selectable element may comprise a link.

Once a determination is made as to a mechanism for surfacing the resource corresponding to the application context data, the resource may be surfaced via resource surfacing engine 220. Thus, the resource may be surfaced via execution of one or more URIs or URLs, transformed from their original format from source computing device 202. The resource may be surfaced at a specific location that it was being surfaced at the time the application context data was received by source computing device 202. For example, if the resource comprises a song or video, and that song or video was being currently played at time location X (e.g., 1:31 into a 3 minute song or video), that specific time in the song or video may be surfaced via execution of the URIs or URLs by target computing device 212. Similarly, if the resource comprises an electronic document or webpage, and that electronic document or webpage was currently surfaced at a specific location (e.g., ⅓ of the way down the page), that specific location in the electronic document or webpage may be surfaced via execution of the URIs or URLs by target computing device 212.

Figure 3:
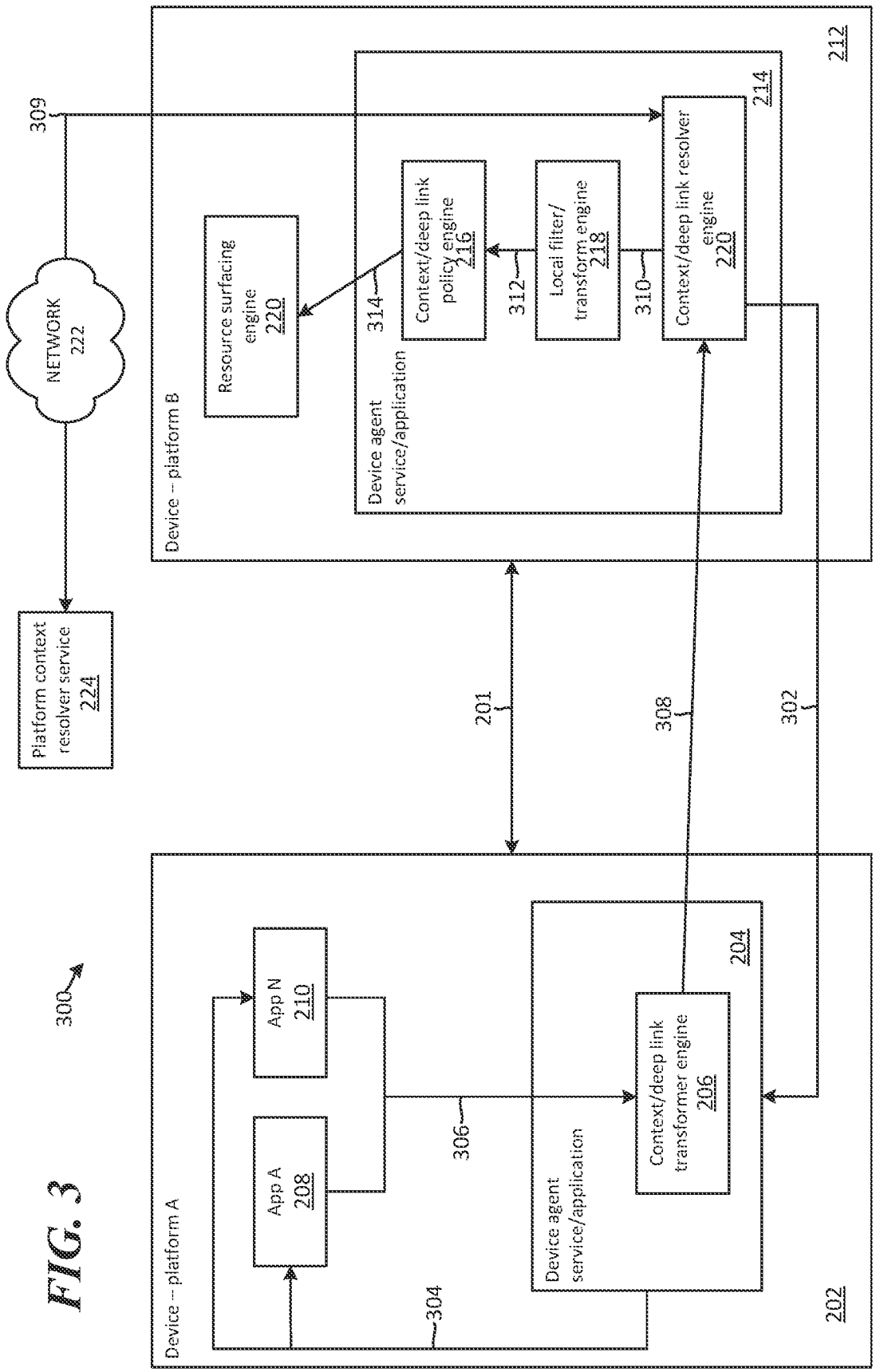
FIG. 3 illustrates the computing devices of FIG. 2 with an exemplary operational flow for sharing application context data and surfacing resources related to that context sharing.

FIG. 3 illustrates the computing devices of FIG. 2 with an exemplary operational flow for sharing application context data and surfacing resources related to that context sharing. FIG. 3 includes source computing device 202, which operates on a first platform (platform A), target computing device 212, which operates on a second platform (platform B), network 222, and platform context resolver service 224.

At operation element 302 a trigger event may occur. The trigger event may comprise source computing device 202 and target computing device 212 establishing a connection with one another (e.g., a Bluetooth connection, a Wi-Fi connection, a wired connection), source computing device 202 and target computing device 212 coming within a threshold distance of one another (e.g., determined via analysis of wireless signal strength, determined via GPS), the unlocking of target computing device 212 (e.g., "point of presence"), and/or a manual user input by a user to one or both of source computing device 202 and/or target computing device 212.

Upon determining that the trigger event occurred, device agent service/application 204 may query or request application context data from one or more applications (e.g., application A 208, application N 210) executed by source computing device 202, as indicated by operation element 304. In doing so, device agent service/application 204 may send a message or broadcast to each of those applications that indicates it is ready to receive application context data, and/or device agent service/application 204 may individually query each application for its state (e.g., query each application for current application context data). The application context data for an application may comprise one or more URIs and/or URLs that define where one or more current resources being accessed by the application are located. The application context data for an application and a particular resource may be provided to context/deep link transformer engine 206 in one or more formats, as illustrated by operation element 306. For example, application A 208 may provide a URI in an application format specific to the operating system executed by source computing device 202 for a specific resource it is currently accessing, as well as a generic URL (e.g., platform agnostic) for the specific resource it is currently accessing. In additional examples, the application context data may comprise one or more values for one or more fields in a resource that an application is currently accessing, or one or more values of one or more objects in a resource that an application is currently accessing.

Upon receiving the application context data, context deep link transformer engine 206 may transform any of the application context data that is platform specific to a platform agnostic form. Transforming the application context data from a first format to a platform agnostic format may comprise determining a type of format that the first format comprises (e.g., an operating system specific URI or URL, an application specific URI or URL) and identifying a local or remote transformation service that provides a platform agnostic transformation for that first format. In some examples, context/deep link transformer engine 206 may call another service (e.g., locator translation store 140, platform context resolver service 224) or API (an API that calls a local transformation service, an API that calls a remote transformation service) to transform the application context data from the first format to a platform agnostic format. In additional examples, context/deep link transformer engine 206 may receive application context data in a generic (e.g., platform agnostic) format that does not need to be transformed. Once the application context data is in a platform agnostic format, it may be transferred to target computing device 212, as illustrated by operation element 308. Although in this example, context/deep link transformer engine 206 is illustrated as being included in source computing device 202, in other examples, context/deep link transformer engine 206 and its associated operations may be executed by target computing device 212. That is in some examples, application context data, in whatever format it is originally received in, may be sent directly to target computing device 212, and any platform or application specific application context data may then be transformed to a platform agnostic form.

Context/deep link resolver engine 220 may receive platform agnostic application data and transform it to a format that is specific to the platform of target computing device 212 (e.g., platform B) and/or specific to an application executed by target computing device 212. The transformation of application context data by context/deep link resolver engine 220 may comprise application of one or more rules that map application context data in a platform agnostic format to a format that is executable by target computing device 212 and/or executable by an application executed by target computing device 212. That is, context/deep link resolver engine 220 may have rules that dictate that application context data received in one or more first platform agnostic formats be transformed to one or more second formats based on the platform of target computing device 212 and/or based on one or more application types executed by target computing device 212.

In some examples, rather than inferring what the correct transformation is from a first format to a second format based on the formats and rules as performed by context/deep link resolver engine 220, context/deep link resolver engine 220 may query platform context resolver service 224, as illustrated by operation element 309. That is, applications may register schemas that define what their translation/transformation rules are with platform context resolver service 224, therefore eliminating any inferences that need be made as to transformation rules for a particular application.

Upon transforming the application context data to a format that is compatible with the platform of target computing device 212, the operating system of target computing device 212, and/or a specific application executed by computing device 212, the transformed application context data is received by local filter/transform engine 218 as illustrated by operation element 218. Local filter/transform engine 218 may receive the transformed application context data and confirm that target computing device 212 has an application that can execute the transformed application context data. For example, if the transformed application context data received from context/deep link resolver engine 220 and/or platform context resolver service 224 is a set of URIs in a specific application format and a set of URLs in a specific operating system format, local filter/transform engine 218 may determine whether the set of URIs and/or the set of URLs are supported and executable by one or more applications installed on target computing device 212.

Upon either determining that an application can or cannot execute the transformed application context data, it is received by context/deep link policy engine 216, as illustrated by operation element 312. Context/deep link policy engine 216 makes a determination as to which application should execute the transformed application context data to surface the resource in its state from source computing device 202 on target computing device 212. Context/deep link policy engine 216 may apply one or more rules to received application context data to determine how to surface a corresponding resource. For example, target computing device 212, the application that provided the application context data, or another party, may have policies that dictate in which manner a resource should be surfaced. Those policies may include preferences for one or more of: surfacing the resource in the application itself (e.g., if application A 208 originated the application context data corresponding to a resource, then surface the corresponding resource via the same application on target computing device 212), surfacing the resource in a web experience, surfacing the resource in a different application, providing the user of the target computing device with an option to choose a mechanism for surfacing the resource, and/or intelligently identifying a user preference for surfacing the resource. The user preference may be determined via one or more machine learning models that have been trained on a dataset comprising previous user interactions with applications and resources from the user of target computing device 212 and/or source computing device 202, and/or from a dataset comprising previous user interactions with applications and resources from one or more other users.

In examples where a determination is made by local filter/transform engine 218 that target computing device 212 does not include an application that can execute the application context data, one or more policies or rules of context/deep link policy engine 216 may dictate that an option (e.g., a selectable link, a pop-up window) be surfaced to download an application that is capable of executing the application context data, and/or a device mirroring application may be surfaced on target computing device 212, which may mirror the user interface of source computing device 202, such that the resource accessed by source computing device 202 may be surfaced by target computing device 212. Such a device mirroring application is illustrated in FIG. 5. The device mirroring application may be determined to be the only means of surfacing a resource corresponding to application context data if there is no web experience for an application and the application does not exist for the platform of target computing device 212 or the operating system of target computing device 212.

Once a determination is made as to a mechanism for surfacing the resource corresponding to the application context data, the resource may be automatically surfaced via resource surfacing engine 220, as indicated by operation element 314. Thus, the resource may be surfaced via execution of one or more URIs or URLs, transformed from their original format from source computing device 202, and/or via a device mirroring application. The resource may be surfaced at a specific location that it was being surfaced on source computing device 202 at the time the application context data was received by source computing device 202 (e.g., by context/deep link transformer engine 206). For example, if the resource comprises audio or video, and that audio or video was being currently played at time location X (e.g., 20:32 into a one-hour audio or video), that specific time into the audio or video may be surfaced via execution of the URIs or URLs by target computing device 212. Similarly, if the resource comprises an electronic document or webpage, and that electronic document or webpage was currently surfaced at a specific location (e.g., ½ of the way down the page), that specific location in the electronic document or webpage may be surfaced via execution of the URIs or URLs by target computing device 212. Additionally, one or more values for one or more fields or objects in the resource that were transferred as application context data may also be surfaced via resource surfacing engine 220.

Figure 4:
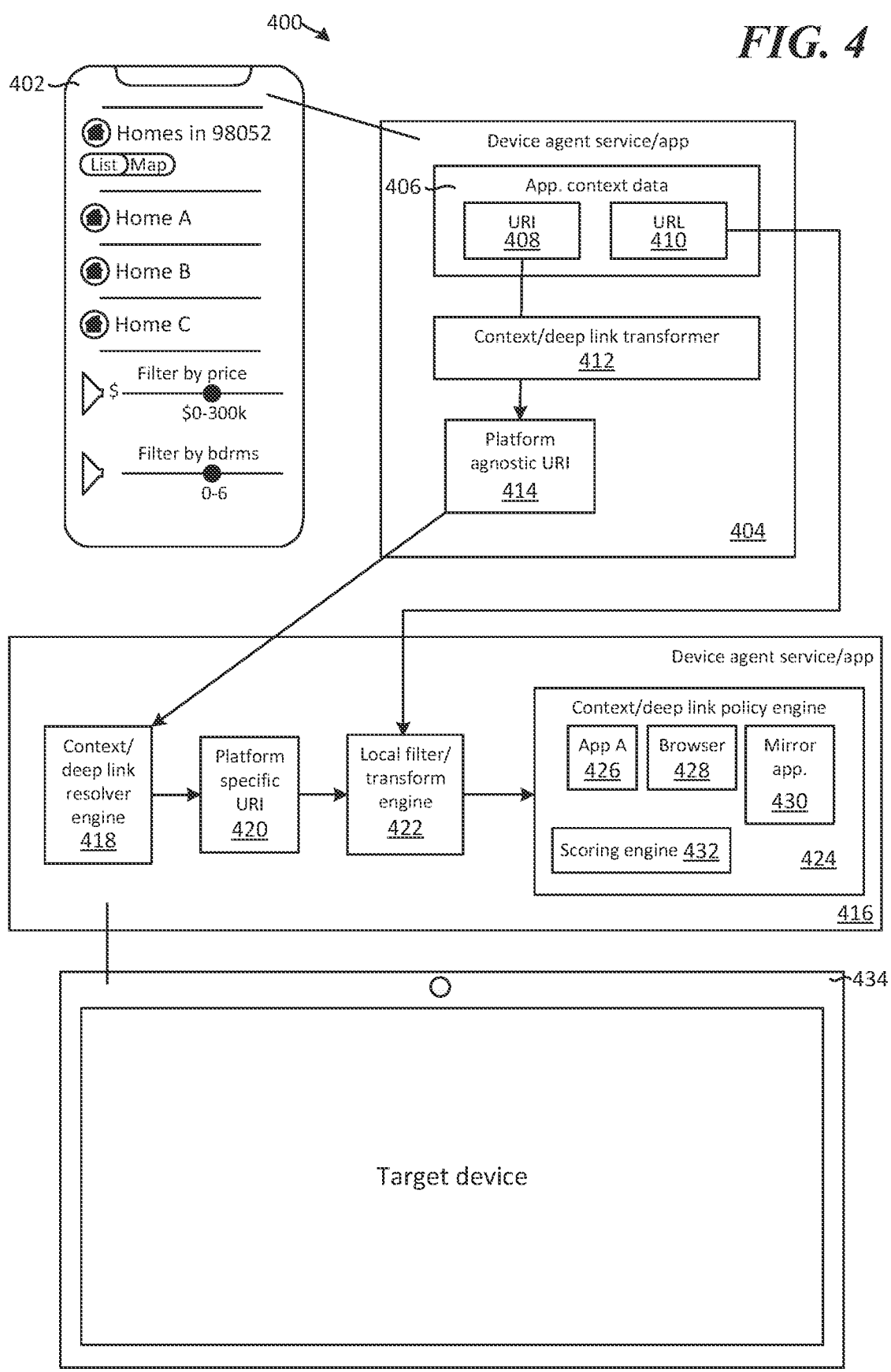
FIG. 4 is a schematic diagram illustrating an example distributed computing environment including a source computing device that transfers application context data to a target computing device, and the processing of the application context data to identify an application to surface a resource corresponding to the application context data.

FIG. 4 is a schematic diagram illustrating an example distributed computing environment 400 including a source computing device 402 that transfers application context data to a target computing device 434, and the processing of the application context data to identify an application to surface a resource corresponding to the application context data. In this example, source computing device 402 is a mobile computing device (e.g., smart phone, a tablet) that is executing device agent service/application 404. Target computing device 434 comprises a desktop computing device in this example, which is executing device agent service/application 416. Although in this example source computing device 402 is a mobile computing device and target computing device 434 is a desktop computing device, it should be understood that the source computing device may comprise a desktop computing device and the target computing device may comprise a mobile computing device in other examples.

Source computing device 402 is executing a real estate application, with specific homes being shown that meet filtering criteria for a zip code (e.g., 98052). In this example, a determination may have been made by source computing device 402 that a trigger event has occurred. As such, application context data 406 from the real estate application may be provided to device agent service/application 404. In this example, application context data 406 comprises URI 408 and URL 410. Application context data may also include values included from the application executed by source computing device 402 (e.g., price filter values, bedroom filter values, zip code input value, house object values). URI 408 may comprise one or more application specific URIs for the real estate application corresponding to the location in the application's database where the home information corresponding to the filters and zip code may be located. Similarly, URL 410 may comprise one or more platform agnostic or operating system specific URLs in a web database where the home information corresponding to the filters and zip code may be located.

Context/deep link transformer 412 may transform URI 408 and URL 410 (if not platform agnostic) to a format that is platform agnostic. In this example, URL 410 is illustrated as being platform agnostic, and as such, context/deep link transformer 412 only transforms URI 408 to a platform agnostic format, with the transformed URI illustrated as platform agnostic URI 414. Source computing device 402 then transfers platform agnostic URI 414 and URL 410 to target device 434.

Platform agnostic URI 414 is received by context/deep link resolver engine 418 of device agent service/application 424. Context deep link resolver engine 418 may apply one or more transformation rules, or communicate with a transformation service, and thereby transform platform agnostic URI 414 to a format that is specific to the platform of target device 434, the operating system of target device 434, and/or an application of target device 434. The transformed URI (platform specific URI 420) is then received by local filter/transform engine 422.

Local filter/transform engine 422 receives platform specific URI 420, as well as URL 410. Local filter/transform 422 may make a determination as to whether one or more applications of target computing device 434 are capable of executing platform specific URI 420 and/or URL 410. If a determination is made that one or more applications of target computing device 434 are capable of executing platform specific URI 420 and/or URL 410, the identity of those applications may be provided to context/deep link policy engine 424. If a determination is made that target device 434 has no applications that can execute URI 420 or URL 410, local filter/transform engine 422 may indicate that determination to context/deep link policy engine 424.

Context/deep link policy engine 424 includes scoring engine 432, which may determine scores for one or more mechanisms that target computing device 434 may utilize to surface the resource(s) transferred via application context data 406 from one or more applications (e.g., the real estate application) from source computing device 402. For example, a determination may have been made by local filter/transform engine 422 that platform specific URI 420 may be executed by application A 426 of target computing device 434 and that URL 410 may be executed by browser application 428. Additionally, device mirroring application 430 may be executed on target computing device 434 and device mirroring application 430 may be capable of mirroring the user interface of source computing device 402 on target computing device 434. As such, the real estate application executed by source computing device 402 may simply be mirrored on target computing device 434 via device mirroring application 430.

Scoring engine 432 may apply one or more rules to received application context data (e.g., URL 410, platform specific URI 420) and/or the one or more applications that the application context data has been determined to be executable by on target computing device 434 to determine how to surface a corresponding resource. In examples, target computing device 434, the real estate application, or another party, may have policies that dictate in which manner a resource should be surfaced in based on the application resources available to target computing device 434 and/or the type of application context data that is provided to target computing device 434. Those policies may include preferences for one or more of: surfacing the resource(s) in the application itself (e.g., application A 426 may correspond to the desktop version of the real estate application), surfacing the resource(s) in a web experience (e.g., via browser application 428), or surfacing the resource(s) via a device mirroring application. Thus, scoring engine 432 may determine scores for each of the mechanisms that are available for executing the application context data on target computing device 434, and one or more highest scored mechanisms (e.g., application A 426, browser application 428, device mirroring application 430) may be utilized to surface the resource(s) corresponding to the application context data. Examples of various mechanisms that target computing device 434 may utilize to surface a resource originally accessed on source computing device 402 via execution of application context data are illustrated in FIG. 5.

FIG. 5 illustrates three target computing devices (computing device 502, computing device 504, computing device 506) and three different mechanisms for surfacing resources on a target computing device.

Computing device 502 is a target computing device that displays a web browser application that is accessing a house sales website that corresponds to the real estate application accessed by source computing device 402 in FIG. 4. Specifically, scoring engine 432 may have determined that browser application 428, of all of the other surfacing mechanisms/applications of target computing device 434, has the highest score associated with it for surfacing the resource(s) from the real estate application accessed on source computing device 402. Thus, URL 410 may be executed by browser application 428, and the resource(s) corresponding to the application page shown on the user interface of source computing device 402 may be accessed via execution of URL 410 and surfaced on the target computing device as illustrated by the browser application user interface of computing device 502.

Computing device 504 is a target computing device that displays device mirroring application 505, which mirrors the user interface of the connected source computing device (e.g., source computing device 402). Specifically, scoring engine 432 may have determined that device mirroring application 430, of all of the other surfacing mechanisms/applications of target computing device 402, has the highest score associated with it for surfacing the resource(s) from the real estate application accessed on source computing device 402. Thus, rather than executing URL 410 or platform specific URI 420, target computing device 434/504 may launch device mirroring application 505 and source computing device 402 may send current user interface display information to target computing device 504, which may be surfaced in device mirroring application 505.

Computing device 506 is a target computing device that displays a desktop version of the real estate application that was being accessed on source computing device 402 in FIG. 4. Specifically, scoring engine 432 may have determined that the desktop version of the real estate application (e.g., application A 426), of all of the other surfacing mechanisms/applications of target computing device 434, has the highest score associated with it for surfacing the resource(s) from the real estate application accessed on source computing device 402. Thus, platform specific URI 420 may be executed by application A 426, and the resource(s) corresponding to the application page shown on the user interface of source computing device 402 may be accessed via execution of platform specific URI 420 and surfaced on the target computing device as illustrated by the desktop version of the real estate application user interface of computing device 506.

Figure 6:
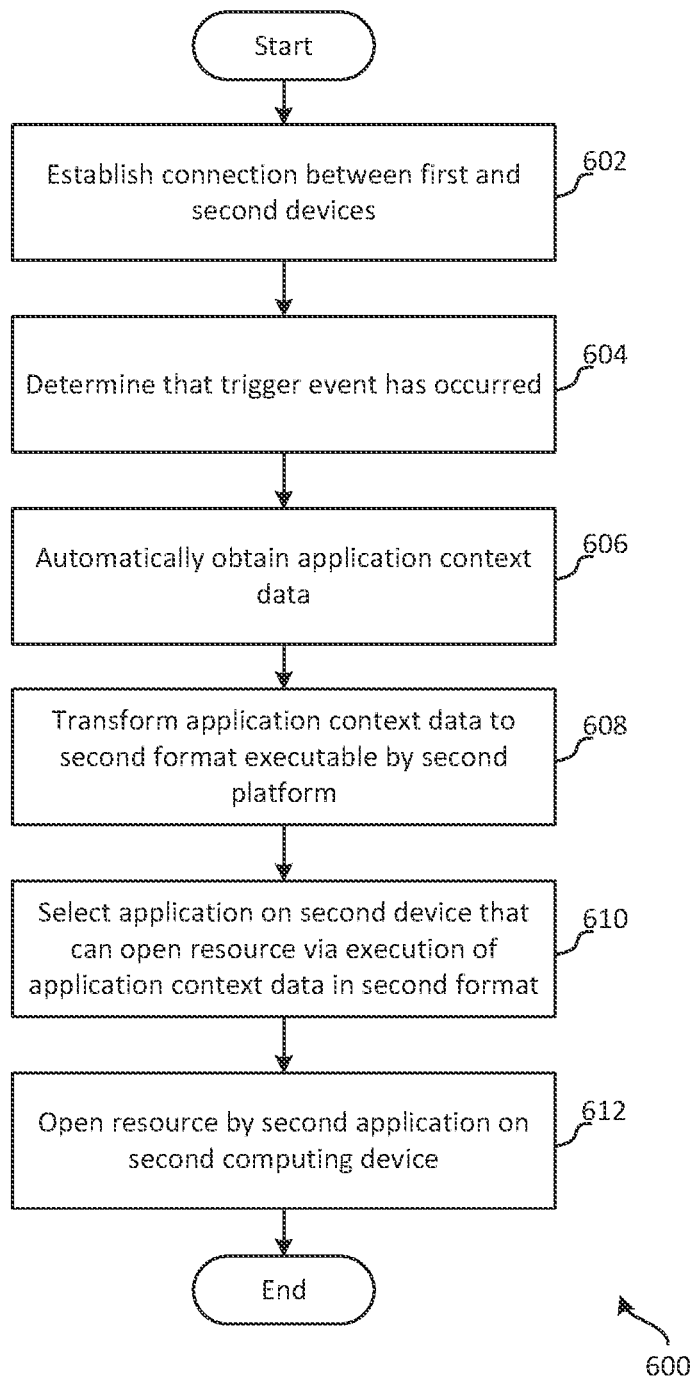
FIG. 6 is an exemplary method for enabling cross-platform access to a resource and application state based on transferred application context data.

FIG. 6 is an exemplary method 600 for enabling cross-platform access to a resource and application state based on transferred application context data. The method 600 begins at a start operation and flow moves to operation 602.

At operation 602 a connection between a first computing device operating on a first platform and a second computing device operating on a second platform is established.

From operation 602 flow continues to operation 604 where a determination that a trigger event for obtaining application context data has occurred is made. The trigger event may comprise the first computing device and the second computing device establishing the connection with one another (e.g., a Bluetooth connection, a Wi-Fi connection, a wired connection), the first computing device and the second computing device coming within a threshold distance of one another (e.g., determined via analysis of wireless signal strength, determined via GPS), the unlocking of the second computing device, and/or a manual user input by a user to one or both of the first and/or second computing devices.

From operation 604 flow continues to operation 606 where application context data from a first application being currently executed by the first computing device is automatically obtained. The application context data may be in a first format and the application context data may specify a location of a resource being currently accessed by the first application on the first computing device. The application context data may be obtained by a device agent executed on the first computing device. In some examples, the device agent may explicitly query the first application for application context data. In other examples, the device agent may broadcast to one or more applications being executed on the first computing device that it is ready to receive application context data. In some examples, the application context data may comprise one or more URIs or URLs for one or more resources being currently accessed by the first application. In additional examples, the application context data may comprise one or more values in one or more fields of a resource currently being accessed by the first application on the first computing device. In additional examples, the application context data may comprise one or more values for one or more objects of a resource currently being accessed by the first application on the first computing device.

From operation 606 flow continues to operation 608 where the application context data is transformed to a second format that is executable by the second platform. In some examples, the application context data may first be transformed to a platform agnostic format, and then the platform agnostic format application context data may be transformed to the second format that is executable by the second platform. The transformation of the application context data to the platform agnostic format and/or to the second format that is executable by the second platform may be performed by the first computing device and/or the second computing device. In examples, the second format may comprise a format that is executable by an application executed by the second computing device. For example, the first format may comprise a URI format that is specific to a specific operating system or device version of an application executed on the first computing device, and the second format may comprise a URI format that is specific to a specific operating system or device version of an application executed on the second computing device.

From operation 608 flow continues to operation 610 where a second application of the second computing device that can open the resource via execution of the application context data in the second format is selected. The selection may comprise determining that a plurality of applications of the second computing device can open the resource via execution of the application context data in the second format, applying one or more application prioritization rules to the plurality of applications, scoring each of the plurality of applications based on the application of the one or more application prioritization rules, and determining that the second application has a highest score of each of the plurality of applications.

From operation 610 flow continues to operation 612 where the resource is opened by the second application on the second computing device via execution of the application context data in the second format. In some examples, the second application may be automatically launched and the resource may be automatically opened by the second application on the second computing device. In other examples, the second computing device may surface a selectable option for launching the second application and surfacing the resource, and only upon selection of that element (e.g., via user input) may the second application and resource be launched. In examples, the values included in the application context data from the first computing device may be automatically filled into the corresponding fields or objects of the resource opened via the second application on the second computing device. In additional examples, the same location of the resource that was open on the first computing device may be opened on the second computing device.

From operation 612 flow moves to an end operation and the method 600 ends.

Figure 7:
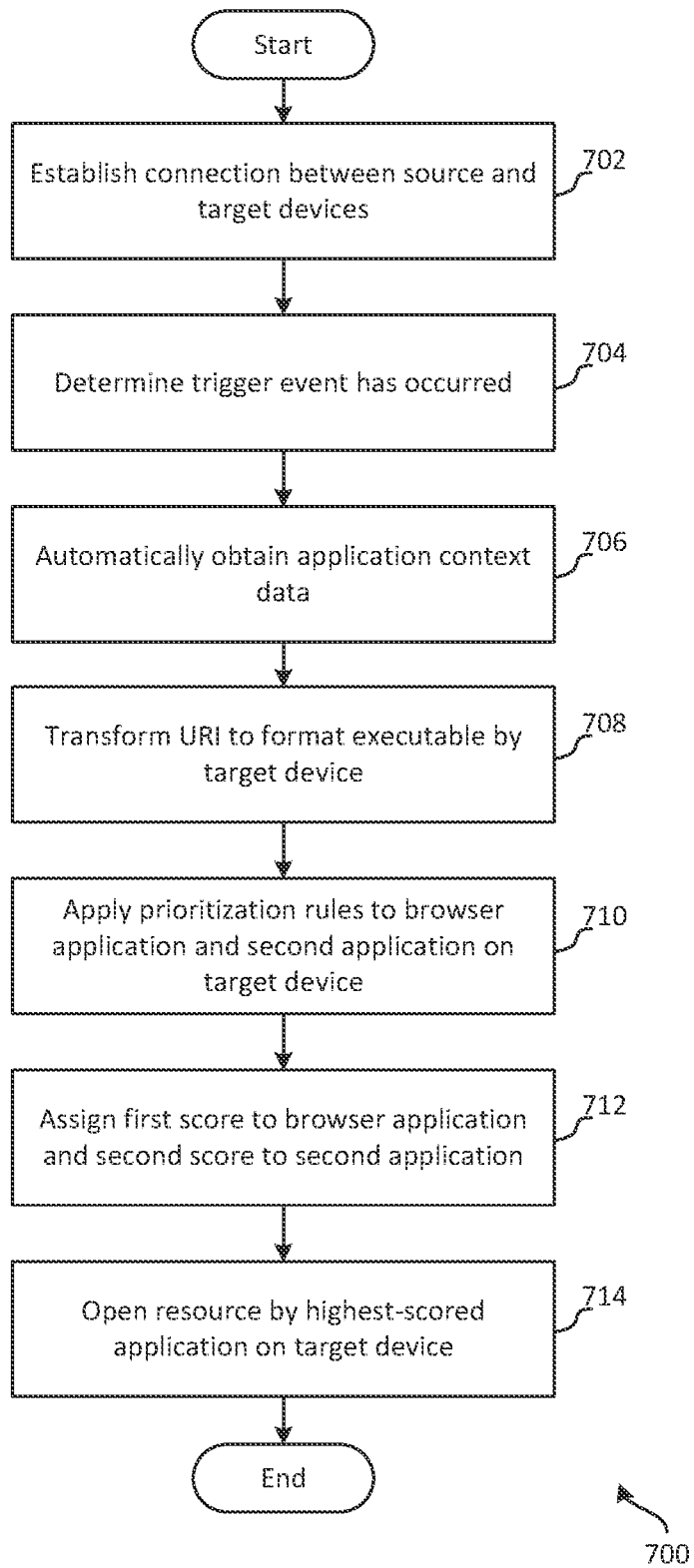
FIG. 7 is an exemplary method for enabling cross-platform access to a resource and application state based on transferred application context data, and identifying an application of a target computing device to surface the resource.

FIG. 7 is an exemplary method 700 for enabling cross-platform access to a resource based on transferred application context data, and identifying an application of a target computing device to surface the resource. The method 700 begins at a start operation and flow moves to operation 702.

At operation 702 a connection between a source computing device operating on a first platform and a target computing device operating on a second platform is established.

From operation 702 flow continues to operation 704 where a determination is made that a trigger event for obtaining application context data has occurred is made. The trigger event may comprise the source computing device and the target computing device establishing the connection with one another (e.g., a Bluetooth connection, a Wi-Fi connection, a wired connection), the source computing device and the target computing device coming within a threshold distance of one another (e.g., determined via analysis of wireless signal strength, determined via GPS), the unlocking of the target computing device, and/or a manual user input by a user to one or both of the source and/or target computing devices.

From operation 704 flow continues to operation 706 where application context data from a first application being currently executed by the source computing device is automatically obtained based on the determination that the trigger event has occurred. The application context data may comprise a URI defining a location of a resource currently being accessed by the first application on the source computing device, and a URL for the resource currently being accessed by the first application on the source computing device.

From operation 706 flow continues to operation 708 where the URI is transformed to a format that is executable by the target computing device (e.g., the operating system of the target computing device, an application executed by the target computing device). In some examples, the URI may first be transformed to a platform agnostic format, and then the platform agnostic format, and that platform agnostic format may then be transformed to the format that is executable by the target computing device. The transformation of the URI to the format that is executable by the target computing device and/or to the platform agnostic format may be performed by the source computing device and/or the target computing device.

From operation 708 flow continues to operation 710 where one or more application prioritization rules are applied to a browser application of the target computing device capable of opening the resource via execution of the URL and the second application of the target computing device capable of opening the resource via execution of the transformed URI. The prioritization rules may be applied by a context/deep link policy engine of the target computing device. The prioritization rules may be associated with the application that the application context data was received from, the target computing device, the browser application, and/or the second application. The prioritization rules may have preferences for one or more of: surfacing a resource in the same application as on the source computing device, surfacing the resource in a web experience, surfacing the resource in a different application, providing the user of the target computing device with an option to choose a mechanism for surfacing the resource, and/or intelligently identifying a user preference for surfacing the resource.

From operation 710 flow continues to operation 712 where a first score is assigned to the browser application based on application of the one or more application prioritization rules and a second score is assigned to the second application based on application of the one or more application prioritization rules.

From operation 712 flow continues to operation 714 where the resource is opened by the highest-scored application on the target computing device. For example, if the web browser application has a higher score assigned to it based on the prioritization rules than the second application, the resource may be opened via execution of the URL by the web browser application. Alternatively, if the second application has a higher score assigned to it based on the prioritization rules than the web browser application, the resource may be opened via execution of the transformed URI by the second application.

From operation 714 flow moves to an end operation and the method 700 ends.

Figure 8:
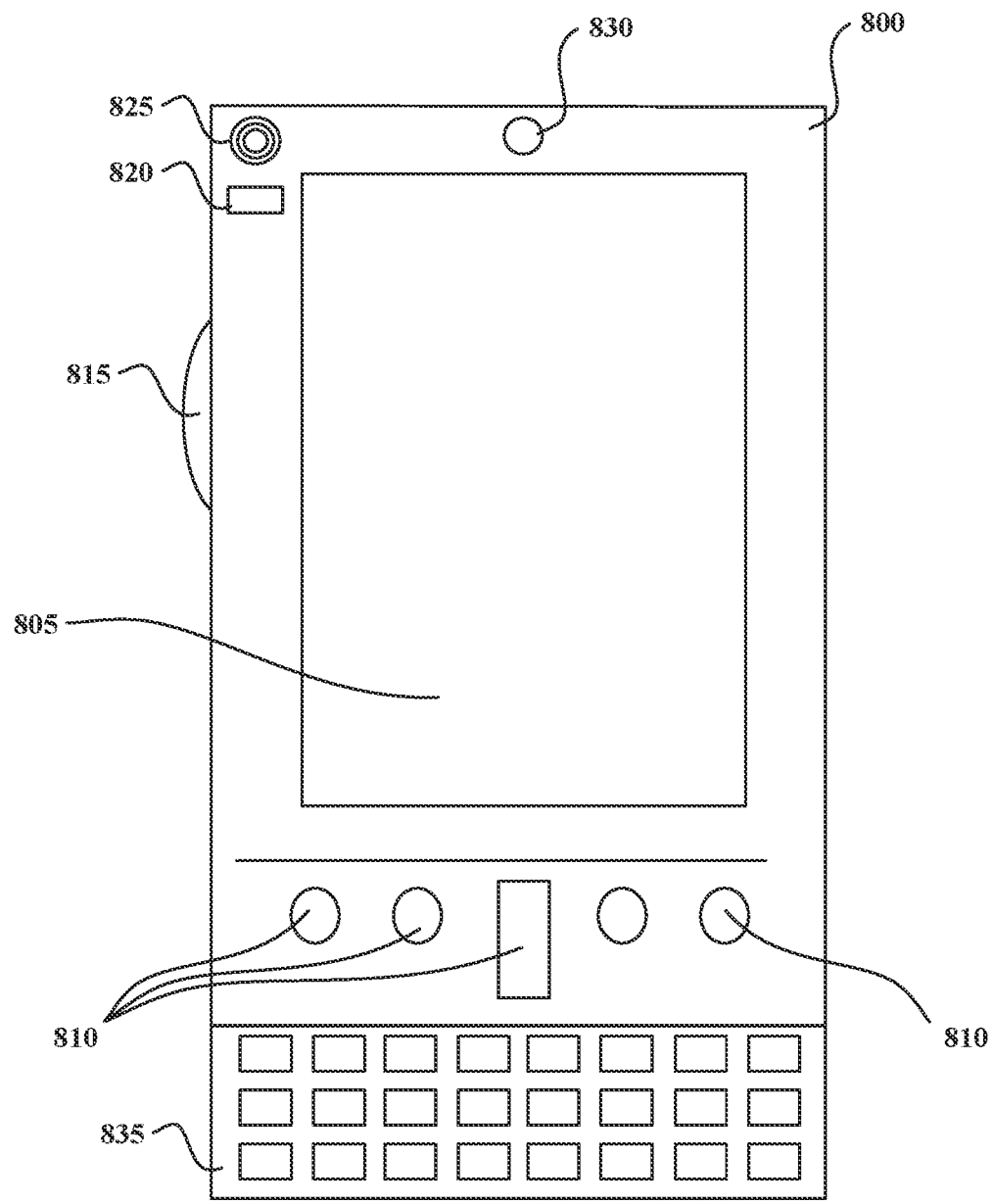
FIGS. 8 and 9 are simplified diagrams of a mobile computing device with which aspects of the disclosure may be practiced.
Figure 9:
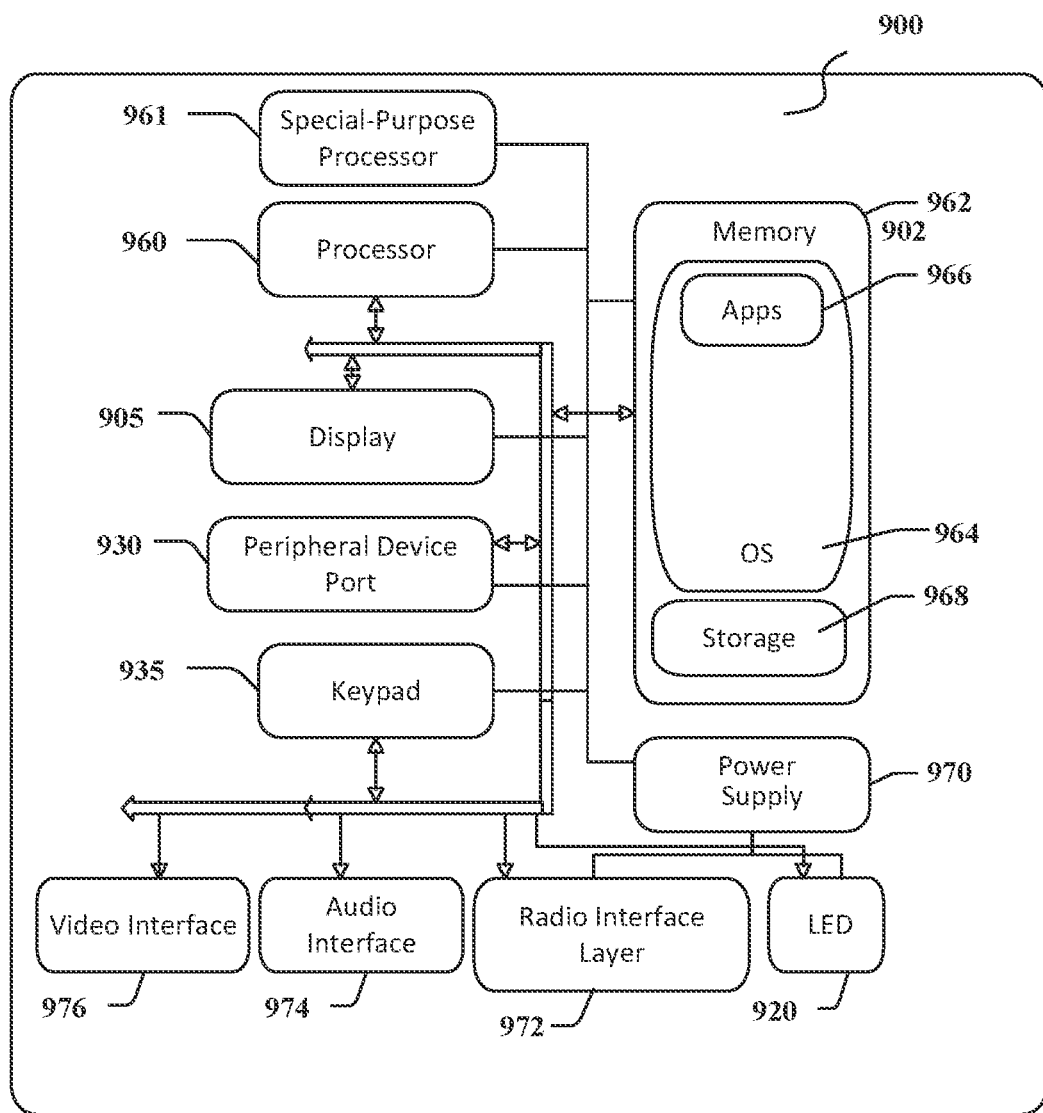

FIGS. 8 and 9 illustrate a mobile computing device 800, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 8, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or fewer input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 9 is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including instructions for providing and operating an asset disposition engine.

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 820 may be used to provide visual notifications, and/or an audio interface 974 may be used for producing audible notifications via the audio transducer 825. In the illustrated embodiment, the visual indicator 820 is a light emitting diode (LED) and the audio transducer 825 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 830 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9 by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
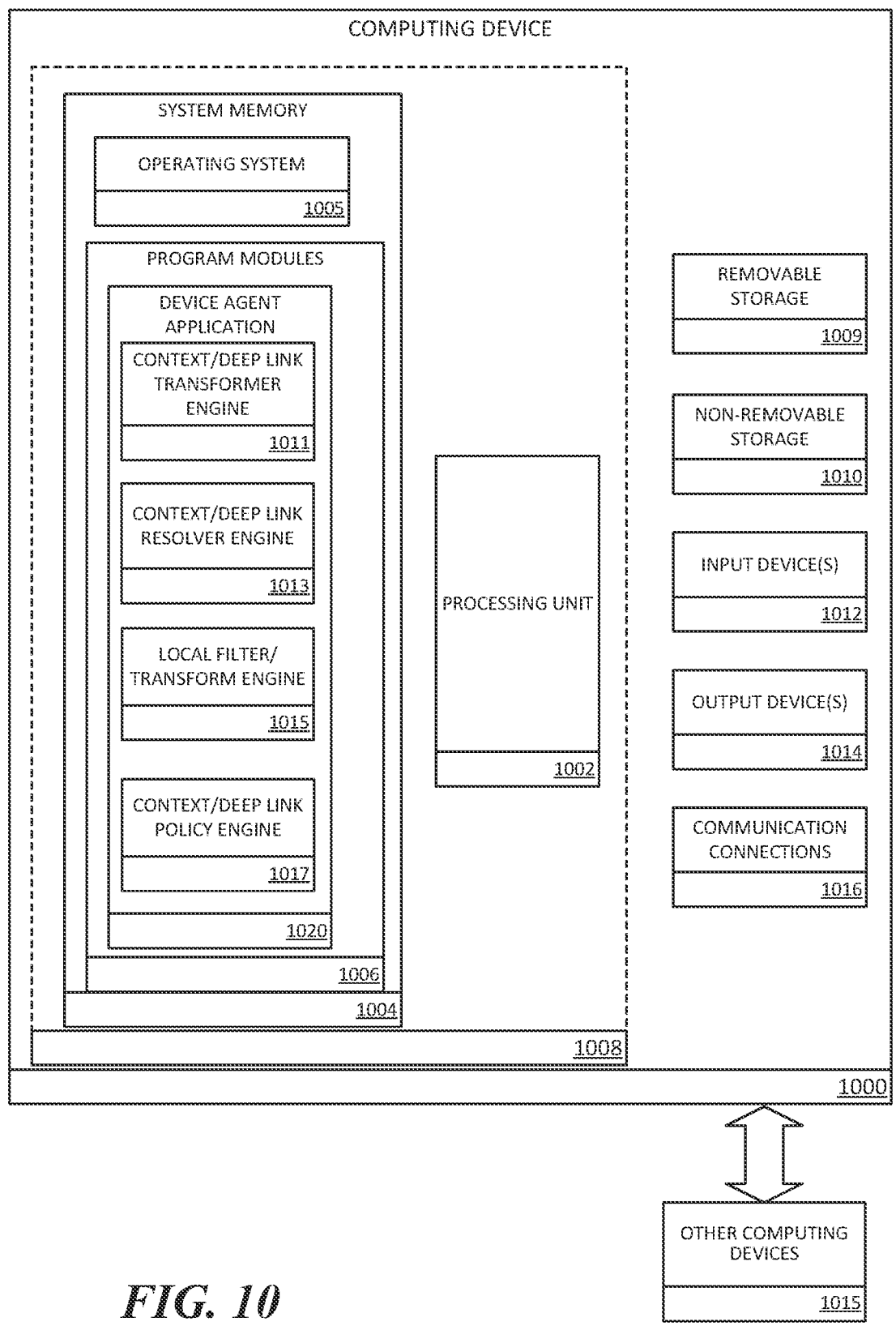
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for assisting with surfacing a resource on a target device in its same state from an application executed on a source device via transformation of application context data. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 suitable for running one or more software applications. The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., device agent application 1020) may perform processes including, but not limited to, the aspects, as described herein. Context/deep link transformer engine 1011 may perform operations associated with transforming application context data (e.g., URIs, URLs) from a platform specific format to a platform agnostic format. Context/deep link resolver engine 1013 may perform operations associated with transforming application context data from a platform agnostic format to a platform-specific and/or applications-specific format. Local filter/transform engine 1015 may perform operations associated with determining which applications of a target computing device can execute platform-specific application context data (e.g., the application context data transformed via application of context/deep link resolver engine 1013). Context/deep link policy engine 1017 may perform operations associated with identifying a preferred application of a target computing device to open a resource with via execution of application context data.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer readable media and computer storage media as described herein does not include transitory media such as a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11:
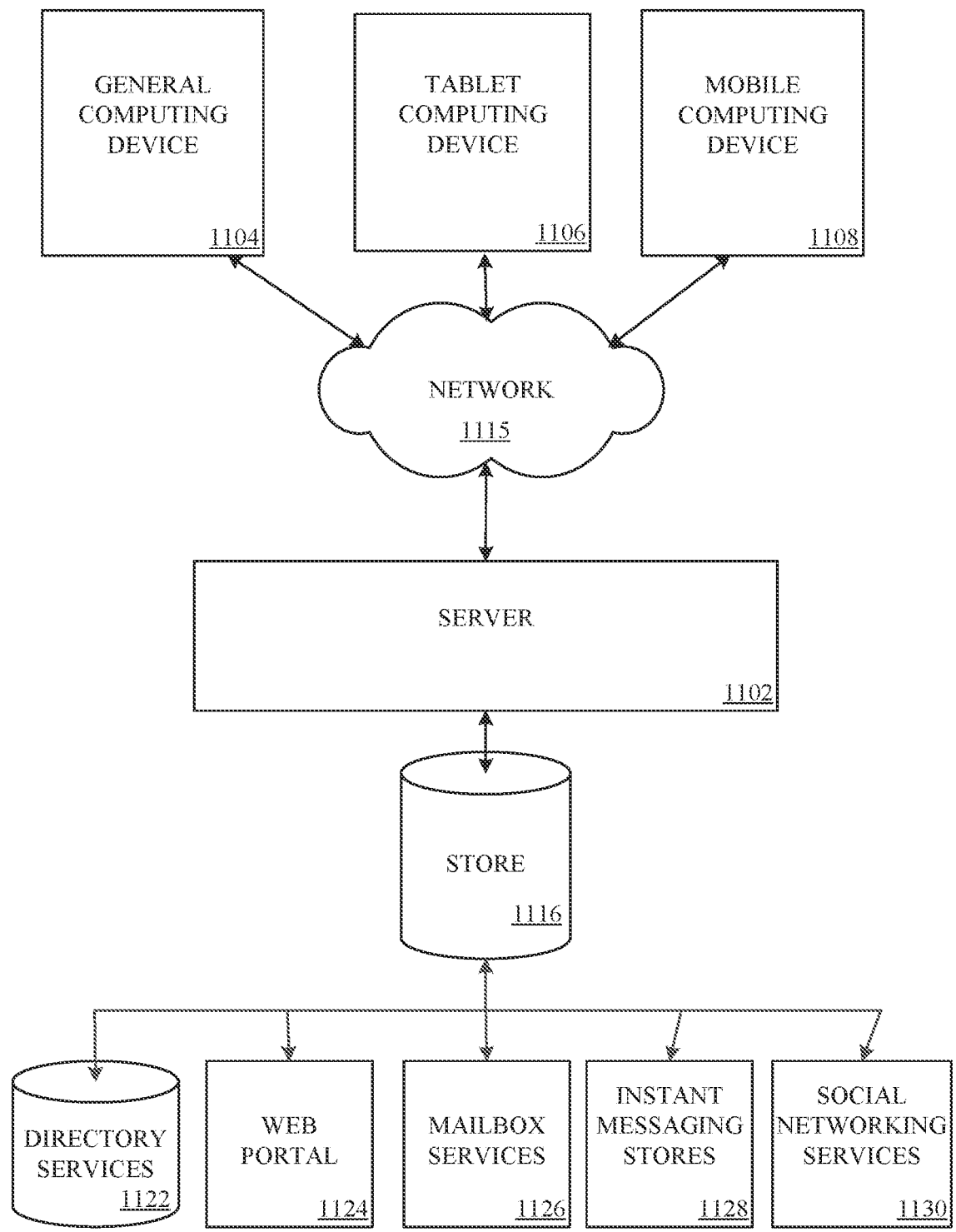
FIG. 11 is a simplified block diagram of a distributed computing system in which aspects of the present disclosure may be practiced.

FIG. 11 illustrates one aspect of the architecture of a system for processing data received at a computing system from a remote source, such as a personal/general computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130. The program modules 1006 may be employed by a client that communicates with server device 1102, and/or the program modules 1006 may be employed by server device 1102. The server device 1102 may provide data to and from a client computing device such as a personal/general computer 1104, a tablet computing device 1106 and/or a mobile computing device 1108 (e.g., a smart phone) through a network 1115. By way of example, the computer system described above may be embodied in a personal/general computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
    establishing a connection between a first computing device operating on a first platform and a second computing device operating on a second platform;
    determining that a trigger event for obtaining application context data has occurred;
    automatically obtaining, based on the determination that the trigger event has occurred, application context data from a first application being currently executed by the first computing device, wherein the application context data is in a first format and the application context data specifies a location of a resource being currently accessed by the first application on the first computing device;
    transforming the application context data to a second format that is executable by the second platform;
    determining that a plurality of applications of the second computing device can open the resource via execution of the application context data in the second format;
    applying one or more application prioritization rules to the plurality of applications;
    scoring each of the plurality of applications based on the application of the one or more application prioritization rules;
    determining that a second application has a highest score of each of the plurality of applications; and
    opening the resource by the second application on the second computing device via execution of the application context data in the second format.

2. The computer-implemented method of claim 1, wherein prior to transforming the application context data to a second format that is executable by the second platform the application context data is transformed to a platform agnostic format.

3. The computer-implemented method of claim 1, wherein the first format of the application context data is associated with an operating system executed by the first computing device, and the application context data defines the location of the resource in a cloud-based data store for the first application.

4. The computer-implemented method of claim 1, wherein the application context data further comprises a specific location in the resource that was currently being accessed by the first computing device when the application context data was obtained.

5. The computer-implemented method of claim 4, wherein the resource is opened to the specific location in the resource by the second application on the second computing device via execution of the application context data in the second format.

6. The computer-implemented method of claim 1, wherein the application context data in the first format comprises one or more uniform resource identifiers.

7. The computer-implemented method of claim 6, wherein transforming the application context data to the second format comprises converting the one or more uniform resource identifiers to one or more different uniform resource identifiers.

8. The computer-implemented method of claim 1, wherein determining that the trigger event for obtaining application context data has occurred comprises at least one of:
    receiving an indication that the connection between the first computing device and the second computing device has been established;
    receiving an indication that the second computing device has currently been unlocked; and
    receiving a point of presence indication for a user of the second computing device.

9. The computer-implemented method of claim 1, wherein:
    the first computing device executes a first operating system; and
    the second computing device executes a second operating system.

10. The computer-implemented method of claim 9, wherein:
    the first application comprises an application of an application format executable by the first operating system but not the second operating system; and
    the second application comprises a same application as the first application in a different application format, and the different application format is executable by the second operating system but not the first operating system.

11. A system comprising:
    a memory for storing executable program code; and
    a processor, functionally coupled to the memory, the processor being responsive to computer-executable instructions contained in the program code and operative to:
    establish a connection between a source computing device operating on a first platform and a target computing device operating on a second platform;
    determine that a trigger event for obtaining application context data has occurred;
    automatically obtain, based on the determination that the trigger event has occurred, application context data from a first application of a first operating system version being currently executed by the source computing device, wherein the application context data comprises:
        a uniform resource identifier (URI) defining a location of a resource currently being accessed by the first application on the source computing device, and
        a uniform resource locator (URL) for the resource currently being accessed by the first application on the source computing device;

transform the URI to a format that is executable by the target computing device;

apply one or more application prioritization rules to a browser application of the target computing device capable of opening the resource via execution of the URL and a second application of the target computing device capable of opening the resource via execution of the transformed URI, wherein the second application is a second operating system version of the first application;

assign, based on application of the one or more application prioritization rules, a first score to the browser application and a second score to the second application; and open the resource by the highest-scored application on the target computing device.

12. The system of claim 11, wherein prior to transforming the URI to a format that is executable by the target computing device, the processor is further responsive to the computer-executable instructions contained in the program code and operative to:

transform the URI to a platform agnostic format.

13. The system of claim 11, wherein the application context data further comprises a specific location in the resource that was currently being accessed by the source computing device when the application context was obtained.

14. The system of claim 13, wherein in opening the resource by the highest-scored application on the target computing device, the processor is further responsive to the computer-executable instructions contained in the program code and operative to:

cause the specific location in the resource to be surfaced by the target computing device.

15. A computer-readable storage device comprising executable instructions that, when executed by a processor, assist with cross-platform resource access, the computer-readable storage device including instructions executable by the processor for:

establishing a connection between a first computing device operating on a first platform and second computing device operating on a second platform;

determining that a trigger event for obtaining application context data has occurred;

automatically obtaining, based on the determination that the trigger event has occurred, application context data from a first application being currently executed by the first computing device, wherein the application context data is in a first format and the application context data specifies a location of a resource being currently accessed by the first application on the first computing device;

transforming the application context data to a second format that is executable by the second platform;

determining that a plurality of applications of the second computing device can open the resource via execution of the application context data in the second format;

applying one or more application prioritization rules to the plurality of applications;

scoring each of the plurality of applications based on the application of the one or more application prioritization rules;

determining that a second application has a highest score of each of the plurality of applications; and opening the resource by the second application on the second computing device via execution of the application context data in the second format.

16. The computer-readable storage device of claim 15, wherein prior to transforming the application context data to a second format that is executable by the second platform, the instructions are further executable by the processor for:

transforming the application context data to a platform agnostic format.

17. The computer-readable storage device of claim 15, wherein the first format of the application context data is associated with an operating system executed by the first computing device, and the application context data defines the location of the resource in a cloud-based data store for the first application.

18. The computer-readable storage device of claim 15, wherein:

the application context data further comprises a specific location in the resource that was currently being accessed by the first computing device when the application context data was obtained, and wherein the instructions are further executable by the processor for:

opening the resource to the specific location in the resource by the second application on the second computing device via execution of the application context data in the second format.

19. The computer-readable storage device of claim 15, wherein:

the application context data in the first format comprises one or more uniform resource identifiers.

20. The computer-readable storage device of claim 15, wherein:

the first application comprises an application of an application format executable by the first operating system but not the second operating system; and the second application comprises a same application as the first application in a different application format, and the different application format is executable by the second operating system but not the first operating system.

* * * * *